United States Patent [19]
Petrak

[11] Patent Number: 5,983,745
[45] Date of Patent: Nov. 16, 1999

[54] PARK BRAKE CABLE SYSTEM INCLUDING CONNECTOR CLIP AND ASSOCIATED METHOD OF TENSIONING

[76] Inventor: Gregory H. Petrak, 16488 W. 55th Dr., Golden, Colo. 80403

[21] Appl. No.: 09/064,402

[22] Filed: Apr. 22, 1998

Related U.S. Application Data
[60] Provisional application No. 60/045,044, Apr. 28, 1997.

[51] Int. Cl.$^6$ ................................ F16C 1/10; B60T 1/00
[52] U.S. Cl. ................................... 74/502.4; 74/501.5 R; 74/502.6; 188/2 D
[58] Field of Search ........................... 29/402.01, 402.08, 29/402.03, 402.04; 74/501.5 R–502.6; 403/310, 30 G, 318, 319; 188/2 D

[56] References Cited

U.S. PATENT DOCUMENTS

| | | | |
|---|---|---|---|
| 2,821,091 | 1/1958 | Benner | 74/482 |
| 3,237,977 | 3/1966 | Batchelder . | |
| 3,513,719 | 5/1970 | Tschanz . | |
| 4,020,713 | 5/1977 | Cantley et al. | 74/479 |
| 4,057,135 | 11/1977 | Mori . | |
| 4,174,099 | 11/1979 | Yamasaki | 74/501.6 R |
| 4,227,594 | 10/1980 | Kluger . | |
| 4,374,597 | 2/1983 | Mochida . | |
| 4,378,713 | 4/1983 | Haskell et al. . | |
| 4,407,167 | 10/1983 | Koukal et al. . | |
| 4,412,458 | 11/1983 | Derringer | 74/512 |
| 4,569,112 | 2/1986 | Dussault | 29/402.08 |
| 4,658,668 | 4/1987 | Stocker . | |
| 4,838,109 | 6/1989 | Stewart . | |
| 5,016,490 | 5/1991 | Jaksic | 74/501.5 R |
| 5,080,434 | 1/1992 | Locher | 74/501.5 R |
| 5,086,662 | 2/1992 | Tayon et al. . | |
| 5,144,856 | 9/1992 | Roca . | |
| 5,203,068 | 4/1993 | Siring | 29/452 |
| 5,211,071 | 5/1993 | Hedstrom . | |
| 5,235,870 | 8/1993 | Hedstrom . | |
| 5,386,887 | 2/1995 | Hilgert et al. . | |
| 5,662,004 | 9/1997 | Osborn et al. | 74/502.4 |

FOREIGN PATENT DOCUMENTS

| | | |
|---|---|---|
| 41 09 887 A1 | 3/1991 | Germany . |
| 42 41 389 A1 | 12/1992 | Germany . |
| 4109887 C2 | 7/1996 | Germany .............. 188/2 D |
| 2-159408 | 6/1990 | Japan . |
| 2 260 588 | 4/1993 | United Kingdom . |

*Primary Examiner*—Vinh T. Luong
*Attorney, Agent, or Firm*—Holland & Hart LLP

[57] ABSTRACT

A method of adjusting the tension in a park cable brake system including the acts of providing a brake actuation lever, a connector clip having a first end and a second end, and including a shear member having a shear failure force positioned between the first and second ends of said connector clip, a brake assembly, a front cable strand having a first and second ends, the first end attached to the brake actuation lever, and the second end engaging the shear member on the connector clip, a rear cable strand having a first end and a second end, the first end attached to the second end of the connector clip and the second end attached to the rear brake assembly, and tensioner means attached in a tension force transmitting relationship with the front cable strand and the rear cable strand. The method further includes the acts of tensioning the front and rear cable strands with the tensioner means to break the shear member. In addition, the method can include the act of actuating the brake lever to break the shear member.

16 Claims, 11 Drawing Sheets

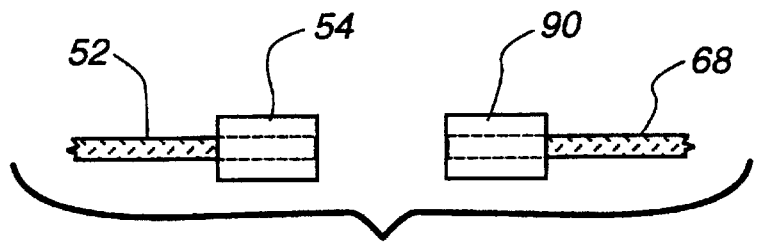
Fig. 5
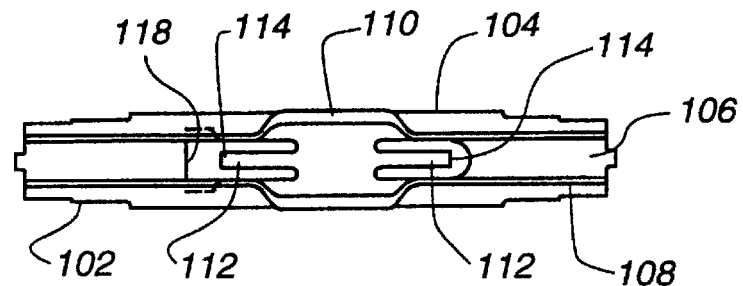
Fig-6
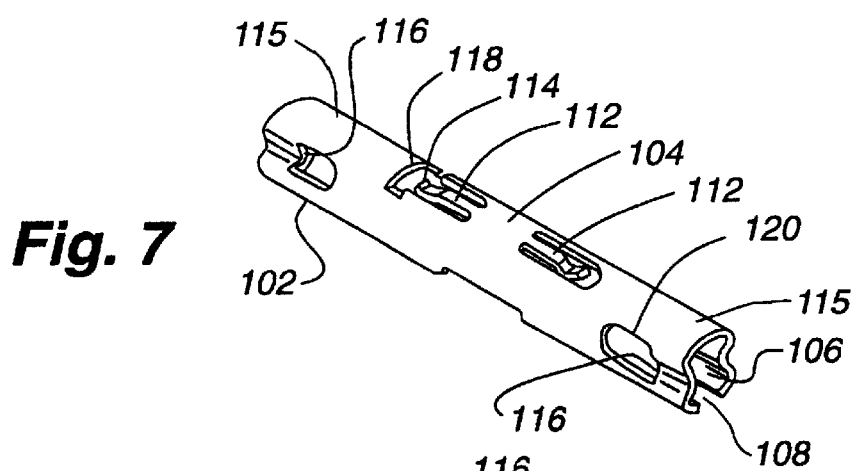
Fig. 7
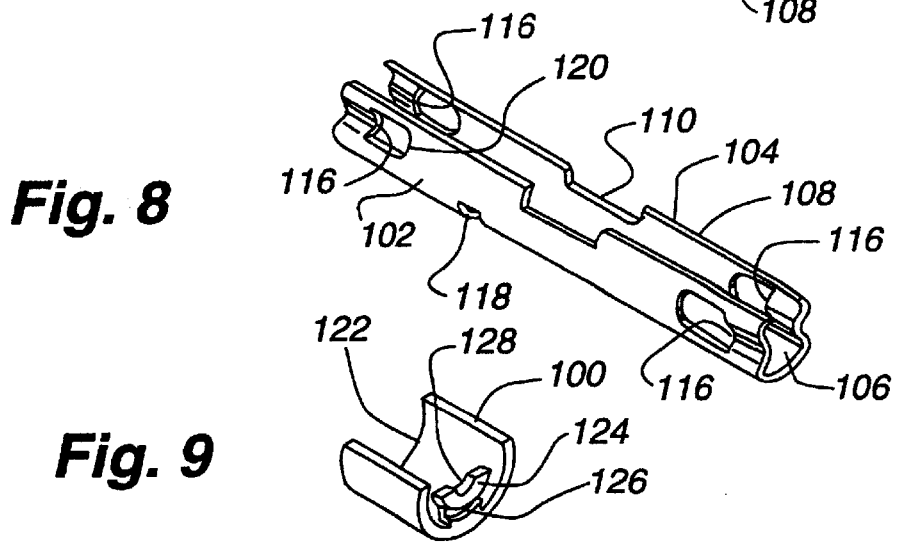
Fig. 8
Fig. 9

PARK BRAKE CABLE SYSTEM INCLUDING CONNECTOR CLIP AND ASSOCIATED METHOD OF TENSIONING

This application claims benefit of provision application Ser. No. 60/045,044 filed Apr. 28, 1997.

FIELD OF THE INVENTION

This invention relates to cable connector clips and particularly to connector clips of the type used to adjust the tension of park brake cable systems used in motor vehicles.

BACKGROUND OF THE INVENTION

Most motor vehicles utilize some type of cable system to engage and release the rear brakes to act as a parking brake. The parking brake system basically includes a pedal or lever actuator, a front cable strand, a left rear cable strand, a right rear cable strand, a front cable conduit, a left rear cable conduit, and a right rear cable conduit through which the front and rear cable strands extend, respectively, an equalizer assembly positioned between the front and rear cable strands, tensioning rod and nut, cable connector and left and right rear brake assemblies. The left and right rear cable strands are attached to the left and right rear brake assemblies, respectively.

The following is a description of the general operation of a park brake system to assist in understanding the invention. A brake pedal or lever is actuated to apply tension to the front cable strand. The front cable strand is connected to the left and right rear cable strands through an equalizer. The function of the equalizer is to equally distribute tension in the front cable to the right and left rear cables so that the tension is balanced between the cables extending to the left and right rear brake assemblies when the lever is actuated. The added tension applied to the rear cable strands overcome the spring in each rear brake assembly to cause the brakes to engage and act as a parking brake. The spring normally holds the rear brake shoes or calipers open and thus disengaged.

In operation, it is desirable that high tension exists in the cables even when the pedal or lever is in the non-actuated position (residual tension). Adequate residual tension in the cable system means that the pedal or lever does not have to be extended a great distance to achieve a strong force at the brake assemblies to provide for secure engagement. Furthermore, the high tension helps eliminate the slack and voids in the cables and conduits, which reduces creep or lengthening of the cable thus making consistent the range of motion of the lever. This same high level of consistency in actuator travel will also exist from vehicle to vehicle.

The objective at the time of installation of the park brake cable system is, therefore, to introduce enough high tension to the cables so that "voids" in the conduit system and cable stretch are effectively removed. In this way the system will not continue to loosen-up over repeated actuation and there will be continued consistency in pedal or lever travel over the life of the vehicle and from vehicle to vehicle. This objective is difficult to achieve in a rapid and inexpensive manner such as required in a high volume automotive assembly line environment.

Various methods of tensioning the cable system are used, all with the goal of introducing enough tension to the cable system during installation to remove voids minimize variation in actuator travel from vehicle to vehicle. One method of tensioning the cable system is to tension the cables during installation to a level where the brakes are almost starting to drag and no further. In this method a predefined level of tension is determined and the park brake cable system of all the vehicles on the assembly line are tensioned to this level. This method typically results in wide variation in lever travel from vehicle to vehicle and also results in a system that loosens-up over time since the voids in the cable and conduit are not sufficiently removed. Merely tensioning to a level just below brake drag does not introduce enough initial tension to completely remove system voids and eliminate cable stretch.

Another method is to tension the cable system during installation to a level far beyond what is required to merely engage the brakes. In doing so, many of the voids in the cable and conduit system are removed and the cable stretch accomplished. The tension in the cable system is then reduced just enough until the brake assemblies are no longer engaged. This method results in an optimally tensioned park brake cable system, however, it is time consuming because the cables must be initially tensioned to a very high level and then de-tensioned to a desired residual tension level. Expensive instruments are required to measure the tension in the cable system at both the tensioning and de-tensioning steps to insure the final or residual tension in the cable system is adequate. This method takes a relatively long time to perform during production of the vehicle.

There is a continuing need in the art for an improved park brake cable system and method for adjusting, including a cable connector clip, that provides the proper amount of tensioning and tension relief for consistent park brake performance for a vehicle, and minimal variation of park brake performance from vehicle to vehicle. It is with the shortcomings of the prior art in mind that the instant invention was developed.

SUMMARY OF THE INVENTION

The invention described herein provides a simple mechanism that simulates the second optimal method without requiring the time necessary to both tension and detension the cable system, and without requiring the expensive tooling and instrumentation necessary to perform this method of brake adjustment.

The benefit of the shear tab cable connector is two fold: 1) to reduce variation in cable and actuator travel from vehicle to vehicle and 2) to allow the cable system to be over-tensioned to remove voids and then to release sufficient tension to unlock the brakes and allow adequate residual tension to remain in the cable system. In this way the cable system does not loosen appreciably over time. An additional objective of the shear tab cable connector is to provide for an optimal cable system tensioning method that does not consume a great deal of time and is therefore suitable for rapid automotive assembly operations.

These objectives are accomplished with the shear tab cable connector as described herein, where during the vehicle assembly process the cable is highly tensioned to a point beyond what is required to lock-up the rear brake assemblies. The shear member is then broken to allow the cable system to slightly de-tension to a desired residual tension level. The amount of residual tension in the cable system is enough so that when the pedal or lever is released the rear brakes disengage only enough to disengage the rear brake assemblies so they are no longer dragging. The shear tab member can be broken by activation of the brake lever, or by continued adjustment of the tensioning means.

The instant invention allows a cable tension adjusting process where the cables are over-tensioned to remove system voids and then loosened only enough to just disengage the brake assemblies. Significant residual tension is therefore left in the cable system even when the brake actuator lever is in the released position, the result being a tight, responsive cable system with little variation in brake actuator lever travel from vehicle to vehicle and a cable system that will not loosen significantly over the life of the vehicle.

The present invention encompasses a park brake cable system including a brake actuation lever, a connector clip having a first end and a second end, and including a shear member, having a shear failure force, positioned between the first and second ends. A brake assembly, a front cable strand having a first and second ends, the first end attached to the brake actuation lever, and the second end engaging the shear member on the connector clip are also included. Further included are a rear cable strand having a first end and a second end, the first end attached to the second end of the connector clip and the second end attached to the rear brake assembly, and tensioner means are attached in a tension force transmitting relationship with the front cable strand and the rear cable strand. Applying tension to the front and rear cable strands by the tensioner means creates at least the sufficient shear failure force to cause the second end of the front cable strand to break the shear member and move to the first end of the connector clip.

In further detail, the instant invention also includes a rear left brake assembly, a rear right brake assembly, an equalizer structure, a rear left cable strand attached to and extending between the equalizer and the rear left brake assembly, and a rear right cable strand attached to and extending between the equalizer and the rear right brake assembly. The actuation of the tensioner means tensions the front, rear right and rear left cable strands.

The tensioner means can be positioned either on the equalizer or on the brake actuation lever.

The present invention also includes a connector clip including a main body having an interior cavity, and open first and second ends, and a shear member extending across a portion of the interior cavity.

In further detail, the present invention also includes a connector clip for park brake cable systems where the shear member has a partial cylindrical main body and defines a tab extending orthogonally inwardly, the main body defining an outer surface and an aperture formed through the main body from the outer surface to the interior cavity, the shear member mounting on the outer surface and the tab extending through the aperture to extend across at least a portion of the interior cavity.

Alternatively, the connector clip also includes the main body having a cylindrical body defining a bore therethrough having interior side walls, the shear member is a shear disk attached to the interior side walls and extends across the bore.

The present invention encompasses a method of adjusting the tension in a park cable brake system comprising the steps of providing a brake actuation lever, a connector clip having a first end and a second end, and including a shear member, having a shear failure force, positioned between the first and second ends, a brake assembly, a front cable strand having a first and second ends, the first end attached to the brake actuation lever, and the second end engaging the shear member on the connector clip, a rear cable strand having a first end and a second end, the first end attached to the second end of the connector clip and the second end attached to the rear brake assembly, and tensioner means attached in a tension force transmitting relationship with the front cable strand and the rear cable strand; tensioning the first and second cable strands with the tensioner means; and breaking the shear member.

In more detail, the present invention also encompasses a method having the additional steps of actuating the brake lever to break the shear member.

Alternatively, the present invention also encompasses a method having the additional steps of tensioning a first and second cable strands with a tensioner means; and breaking a shear member engaged by one end of the first cable strand.

Accordingly, it is the primary object of the present invention to provide a park brake cable system that is easily adjusted and set at the appropriate tension during assembly.

It is another object of the present invention to provide a connector clip for park brake cable systems that includes a shear member that allows sufficient high tension application, and once broken, establishes the proper residual stress in the cable system.

Other aspects, features and details of the present invention can be more completely understood by reference to the following detailed description of a preferred embodiment, in conjunction with the drawings, and from the appended claims.

BRIEF DESCRIPTION OF THE DRAWINGS

FIG. 5 shows a view of the cable ends.

FIG. 6 is a bottom view of the first embodiment of the connector clip used with the side-pull park brake cable system.

FIG. 7 is a top perspective view of the connector clip of FIG. 6.

FIG. 8 is a bottom perspective view of the connector clip of FIG. 7.

FIG. 9 is a bottom perspective view of the shear member used with the connector clip of FIG. 6.

DETAILED DESCRIPTION OF THE PREFERRED EMBODIMENT

Figure 1:
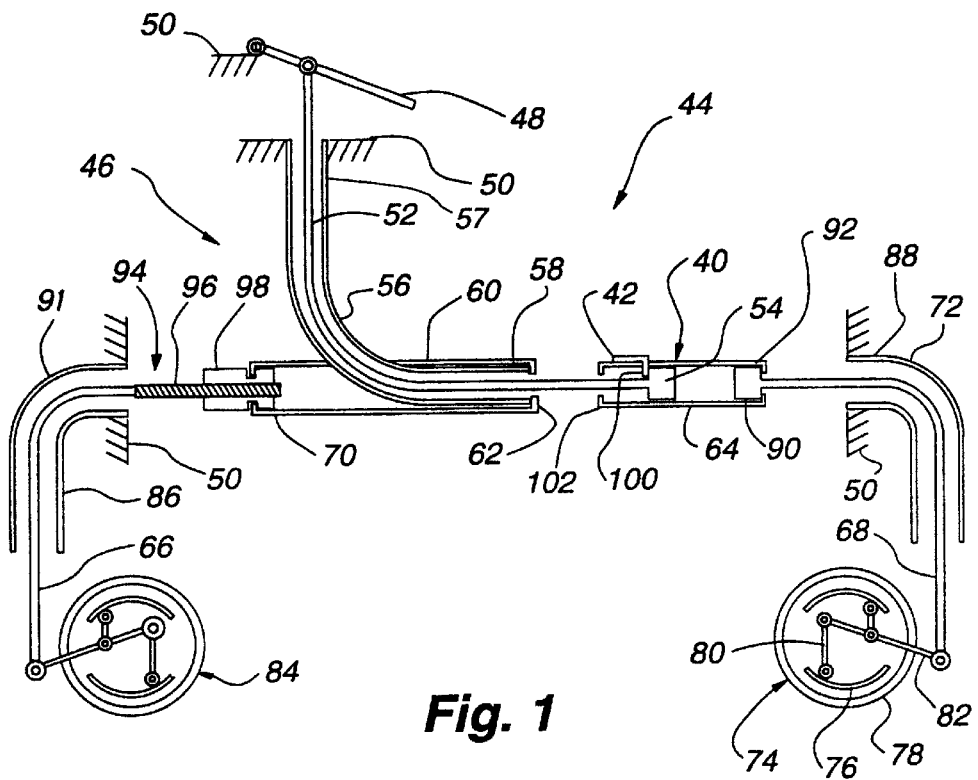
FIG. 1 is a schematic diagram of a reaction conduit side pull park brake cable system of the present invention, including the connector clip having a shear tab, the system being in a relatively low tension state.

As a general description with reference to FIG. 1, the present invention concerns the use of a connector clip 40 having a shear member 42 in a park brake cable system. The shear member 42 allows the application of a very high tension to the cable system 44 to eliminate voids in the system and accelerate the cable stretch that would otherwise occur during use. The shear member 42 also allows a calculated detensioning of the cable system 44 to a residual tension level desired for consistent performance.

The cable systems described below fall into one of two categories: a side-pull park brake cable system, also referred to as a reaction-conduit system, and a center-pull park brake cable system. Each of these two types of cable systems includes a brake activation lever movably attached to the vehicle, a front cable strand, an equalizer structure, left and right rear cable strands, conduits through which the cables extend, left and right rear brake assemblies, and a connector clip having a shear member.

The park brake cable system of the present invention is described below with respect to brake assemblies having brake pads and brake drums. It is contemplated that the park brake cable system of the present invention would work equally well with disk brake systems having calipers and rotors.

The connecting clip on which the inventive park brake system is based includes a body structure having either a shear tab or a shear disk attached thereto. The shear member can be integrally formed with the connector clip, or can be a separate member attached to the connector clip. The shear tab or disk is designed to require a calculated shear force to break the tab or disk from the body member, which allows the tension in the cable system to change from a desired high tension (for removing voids and stretching the cable) to a desired residual tension.

The park brake cable system, the connector clip and shear member, and associated method, are described below in detail.

Referring to FIGS. 1 through 4, the operation of a side-pull parking brake cable system is shown in schematic form. A side-pull parking brake cable system 46 utilizes a known or available reaction-conduit type structure. The reaction-conduit structure includes a brake actuating lever 48 movably attached to the structure 50 of the vehicle, a front cable strand 52 attached at one end to the lever 48 and defining at the other end a cable bead 54. The front cable strand 52 extends through a flexible front conduit 56. The conduit 56 is flexible along its length, but is relatively rigid in the axial orientation, and can be made of wound metal as is known in the art. The first end 57 of the conduit 56 is attached to the vehicle frame 50 and the second end 58 of the conduit is attached to an equalizer structure 60. The front conduit 56 extends through an aperture in the side of the equalizer structure 60 with its second end 58 abutting the inside of the first end 62 of the equalizer structure 60. The front cable strand 52 extends out of the first end 62 of the equalizer structure 60 and is seated in an intermediate position in the connector clip 64 of the present invention. The front cable strand 52 is functionally attached to two rear cable sections, left 66 and right 68 as shown in FIG. 1. The front cable strand 52 is attached to the right rear cable strand 68 by the connector clip 64, and is attached to the left rear cable strand 66 through the second end 70 of the equalizer structure 60.

The right rear cable strand 68 extends through a conduit 72, similar to the conduit 56 described above, and attaches to a right rear brake assembly 74. The assembly shown in FIG. 1 is a representation of a drum brake assembly as is known in the art with brake pads 76, a drum 78, and associated internal mechanisms 80. Drum brake assemblies 74 are well-known. The right rear cable strand 68 is attached to a lever arm 82 which actuates the brake pads 76 to engage the brake drum 78 to effect a stopping force on the turning drum (and acts as a brake), as is well-known in the art. The rear left cable strand 66 extends from the second end 70 of the equalizer 60 to a left drum brake assembly 84, in an analogous manner to that of the right drum brake assembly 74. The left rear cable strand 66 also extends through a conduit 86 similar to that described above. At least the first end 88, of the rear right conduit 72 and the front end 91 of the left rear conduit 86 are structurally fixed to the vehicle frame 50.

The rear right cable strand 68 at its first end includes a crimp-on-end bead 90 which is inserted into the connector clip 64 of the present invention, which is seated in the second end 92 of the connector clip 64 of the present invention. The first end 94 of the rear left cable strand 66 is attached to a threaded rod 96, such as the shank of a bolt or screw. The threaded rod 96 is received in a tension adjusting nut 98, which is in turn rotatably engaged in the second end 70 of the equalizer structure 60. The tension adjusting nut 98 is fixed in axial position with respect to the equalizer 60, but is allowed to rotate. The rotation of the tension adjusting nut 98 either draws the threaded rod 96 into the nut 98 and tightens the left rear cable strand 66 (and the whole cable system), or moves the threaded rod 96 away from the tension adjusting nut 98 and loosens the left rear cable strand 66 (and the whole cable system).

The parking brake lever 48 is movable from a released position where no increased tension is applied to the cable system 46, and can move to subsequent positions of ever increasing tension applied to the cable system, which occurs when the lever is moved upwardly with respect to the position shown in FIG. 1.

In assembling the park brake cable system 46, the tension of the rear left 66 and right 68 cable strands and the front cable strand 52 are very important. It is important to note in FIG. 1 that the brake pads in the left and right rear brake assemblies are not in engagement with the brake drums at the initial level of tension in the brake cable system 46 when assembled. The cable bead 54 at the second end of the front cable strand 52 is seated in the intermediate position of the connector clip 64 with one end of the bead 54 engaging a shear member 100, in this case a shear tab, extending through the wall of the connector clip 64, which inhibits the axial movement of the bead 54 from this position toward the first end 102 of the connector clip 64. The particular structure of the connector clip 64 and the shear tab 100 are described in greater detail below with respect to FIGS. 6–18.

After the cable system 46 is initially assembled into the structure shown in FIG. 1, the cable system must be tensioned to a high level to remove voids from the cables themselves, as well as those formed by the interactions of the cables and the conduits, and to accelerate the creep, or lengthening, of the cables when initially put under tension. A sufficient level of tension for the side pull system 46 depends on the particular components, but generally is in the range of 160 to 250 pounds of force. Tension can be applied to the cable system 46 shown in FIG. 1 by either moving the lever upwardly to pull the front cable strand 52, which tightens the right 68 and left 66 rear cable strands, or by actuating the tension adjusting nut 98 to draw the threaded rod 96 into the equalizer structure 60. Due to the forced balancing of the front 52 and rear left 66 and right 68 cable conduits, either of the above methods increases the tension in the cable system 46.

Figure 2:
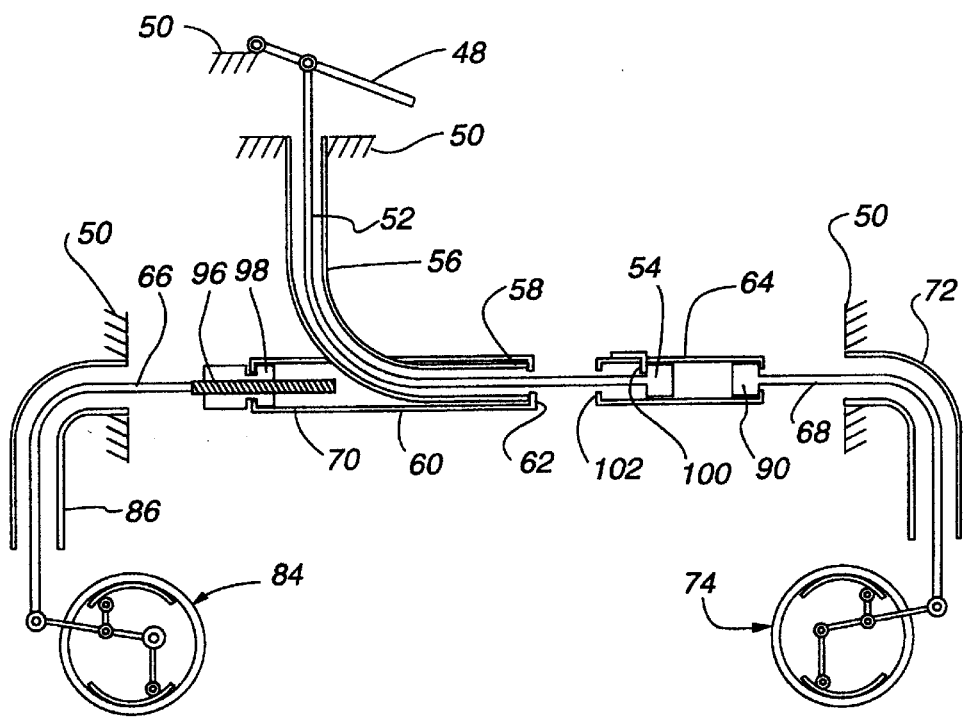
FIG. 2 is a schematic diagram of a reaction conduit side pull park brake cable system of the present invention, including the connector clip having a shear tab, the system being in a relatively high tension state.

In FIG. 2, tension is increased in the cable system 46 by actuation of the tension adjusting nut 98, the tensioning means which draws the threaded rod 96 towards or into the equalizer 60, as mentioned briefly above. The length of the left rear cable strand 66 is thus effectively shortened and actuates the left rear brake assembly 84 and right rear brake assembly 74 to cause the brake pads to engage the brake drum, respectively. The brake lever 48 is still in its initial position, and the shear tab 100 holds the end bead 54 at the intermediate position in the clip connector 64. At this point the entire cable system 46, including the left rear strand 66, right rear strand 68, and front cable strand 52 are all under a relatively high tension force due to the actuation of the adjusting nut 98 to draw the threaded rod 96 towards the equalizer 60. The tension in the cable system 46 increases slightly as the adjusting nut 98 is actuated while the brake pads move towards the drums and the tension overcomes the springs in the brake assembly. However, once the brake pads engage the drums, the tension increases more quickly because the terminal ends of each of the cables are substantially fixed (at the brake assemblies and at the brake lever). At this point the cable strands themselves are lengthening under the increased tension, and the voids are being removed in the engagement of the various cables with the various conduits. This initial tensioning step is preferably performed at the beginning of the vehicle assembly line, just after the park brake cable system is installed.

Figure 3:
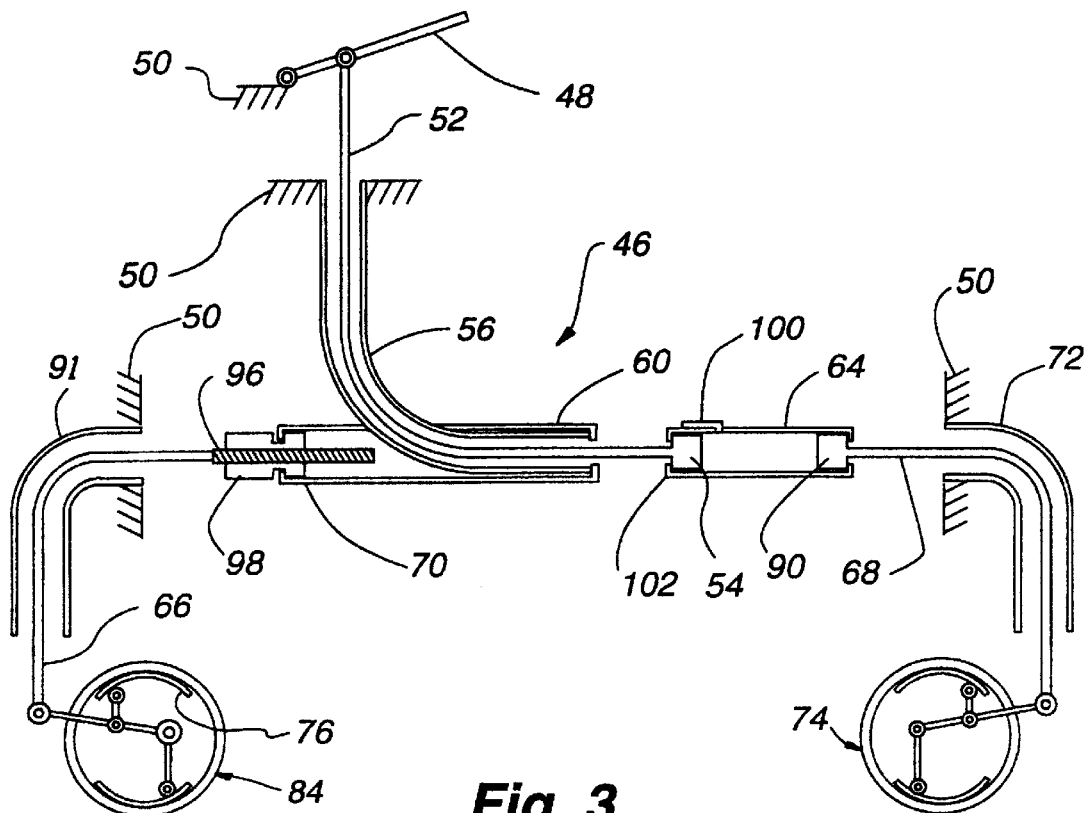
FIG. 3 is a schematic diagram of a reaction conduit side pull park brake cable system of the present invention, including the connector clip having a shear tab, the system being in a lower tension state after the shear tab has broken.

This increased tension level is maintained until, as shown in FIG. 3, the brake lever 48 is actuated to further increase the tension in the system 46 through the pulling motion applied to the front cable strand 52 by the movement of the brake lever 48 (upwardly as in FIG. 3). As the brake lever 48 is applied, the shear strength of the shear tab 100 is overcome by the force of the front cable strand 52 on the end bead 54 and the end bead 54 thus moves from the intermediate position in the clip connector 64 to the terminal position in the first end 102 of the clip connector 64. The tab shear strength is approximately 160 to 250 pounds but can be modified as desired. The amount of axial movement of the end bead 54 from the initial position to the terminal position in the first end 102 of the clip connector 64 is a calculated distance, called the relief distance, which de-tensions the cable system 46 a calculated amount. The relief distance is approximately 13–25 millimeters, which de-tensions the cables. While the cable system 46 is de-tensioned somewhat by the failure of the shear tab 100 and the movement of the end bead 54 through the relief distance, the brake pads are all still engaged with the brake drums to keep the left and right rear brakes in an engaged condition.

Figure 4:
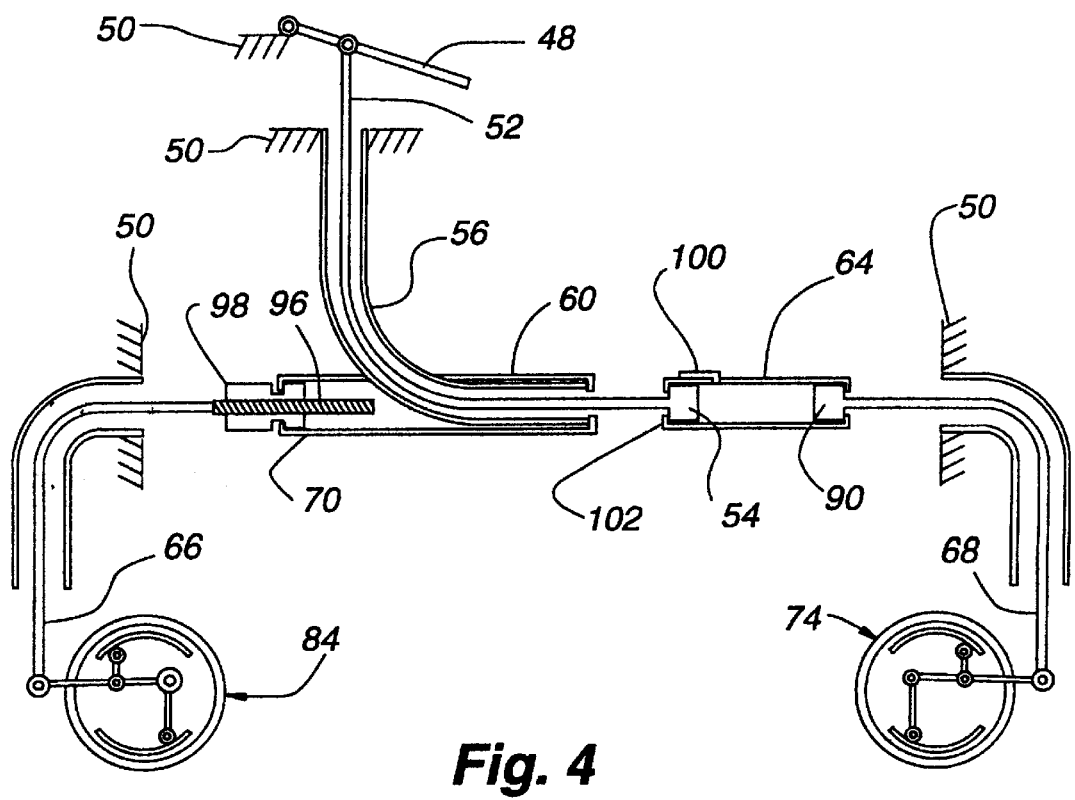
FIG. 4 is a schematic diagram of a reaction conduit side pull park brake cable system of the present invention, including the connector clip having a shear tab, the system being in a residual tension state.

As shown in FIG. 4, the brake lever 48 is then moved back to its initial position, which further de-tensions the cable system 46. This level of tension is called the residual tension, and is approximately 90 to 130 pounds. When the brake lever 48 is moved back to its initial position (downwardly in FIG. 4), the tension is decreased sufficiently to allow the brake pads to disengage from the drums. The combination of the relief distance and the movement of the brake lever 48 actuated to its initial position is calculated to disengage the brake pads from the brake drum to allow the wheels to turn uninhibited by the park brake cable system. The brake lever 48 can now be activated to engage the brake assemblies without appreciable loosening over time, since the voids in the cable system 46 have been significantly reduced, and the cable stretch has been accounted for.

In summary, FIGS. 1 through 4 show the steps of assembling the park brake cable system with its various components, tensioning the park brake cable system by the tension adjusting nut 98 to cause the brake pads to engage the brake drums and allow a high tension to be applied, actuating the brake lever 48 to cause the shear tab 100 to fail and allow the front cable strand bead 54 to move through the relief distance from the intermediate position to the terminal seated position in the connector clip 64 (which relieves some tension in the cable system yet maintains engagement of the brake shoes with the brake drums), and finally moving the brake lever 48 from the actuated position to its initial position to further relieve tension (only residual tension remains) in the cable brake system and allow the brake pads to disengage from the brake drums. The cable system is still under a residual tension at this point, which is not sufficient to overcome the spring force in the brake assemblies and cause the brake pads to engage the brake drums. This residual tension is controlled by the force of the springs in the brake assemblies.

FIG. 5 shows the end beads 54, 90, representative of those formed at the end of each cable. The beads are typically cylindrical pieces of metal fixed to the end of the cable strands such as by crimping. The end beads are attached to the cable strands to withstand tension forces, and allow the cable strands to be attached at their ends to various fixtures, such as the clip connector.

FIGS. 6 through 18 show two embodiments of the clip connector 64 of the present invention. FIG. 6 is a bottom view of the first embodiment 104 clip connector. The clip connector 104 is generally a cylindrical tube having an axial cavity 106 and a continuous slot 108 formed along one side, denoted the bottom side, and having various other crimpings and stampings formed along the length of the cylindrical tube. A central portion 110 of the bottom slot 108 is widened to allow the insertion of an end bead 54 (not shown) through the widened portion into the axial cavity 106. The end bead 54 cannot pass through the slot 108 other than at the widened portion.

Opposing cantilever springs 112 are formed in the top surface of the clip connector 104. The cantilever springs 112 extend longitudinally along the length of the clip connector. Each of the springs is a cantilever, with the free end 114 of each of the springs 112 being bent to extend slightly into the cavity 106 of the clip connector 104 for purposes described below. Each of the ends 115 of the clip connector 104 are crimped inwardly to form an abutment surface 116 against which the end bead of a cable strand engages. The abutment surface 116 keeps the end bead from exiting the clip connector 104 through either end.

A radial slot 118 is formed through the clip connector 104 near its first end 102 and adjacent to the free end 114 of the cantilever spring member 112. See FIGS. 6 through 8. Apertures 120 are formed at both the first and second ends of the clip connector adjacent to the crimped region. The apertures 120 allow the crimped ends to form the abutment surface 116, and allow another exit port for the broken portion of the shear tab 100.

Figure 10:
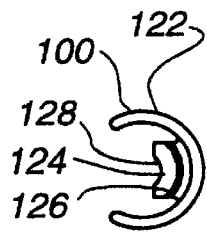
FIG. 10 is an end view of the shear member of FIG. 9.
Figure 11:
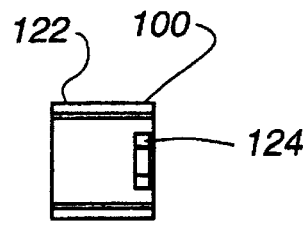
FIG. 11 is a bottom view of the shear member of FIG. 10.

The shear member 100 is shown in FIGS. 9, 10 and 11. The shear member 100 has a main body 122 defining an elongated C-shaped partially cylindrical clamp which defines a shear tab 124 extending radially inwardly. The C-shaped clamp fits over the outside of the clip connector 104, and because of its concentric shape, is not readily removed therefrom. The shear tab 124 extends through the radial slot 118 formed in the outside of the clip connector 104 and extends radially inside the cavity 106 of the clip connector. The shear tab 124 defines an annular depression 126 near the connection of the shear tab 124 with the C-shaped clamp portion. This annular depression 126 is a stress riser. The inside edge 128 of the shear tab 124 also defines a radial curve. The curved shape of the tab 124 helps maximize contact with the end bead for consistent and evenly applied force between the end bead and the shear tab 124.

The stress riser 126 is on the front surface of the shear tab 124 and is designed to create a calculated shear force necessary to shear the shear tab 124 from the clamp when it is positioned through the wall of the clip connector. The sheer force is applied by the cable end in step three of the method described above. The necessary shear force is related to the dimensions of the stress riser 126, the material used in the shear member 100, and the length of connection of the shear tab 124 to the main body 122. A desired shear strength is 160 to 250 pounds. The shear member 100 is made of a rigid glass-filled plastic with a high flexural strength or a high modulus of elasticity, and the shear tab 124 is typically the same material.

Figure 12:
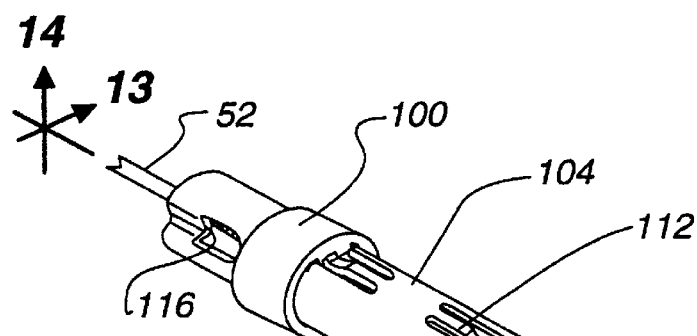
FIG. 12 is a perspective view of the first embodiment of the connector clip of FIG. 6, with the shear member of FIG. 9 applied thereto, and the cable ends of FIG. 5 positioned therein.
Figure 13:
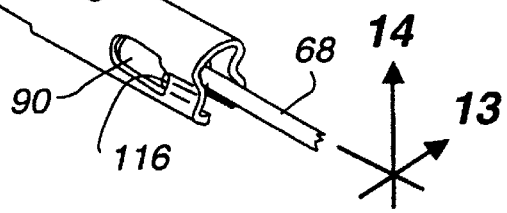
FIG. 13 is a section taken along line 13—13 of FIG. 12, showing one cable end in the intermediate position resting on the shear tab.
Figure 13:
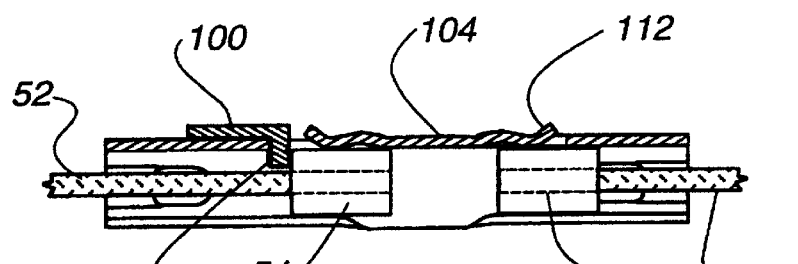
Figure 14:
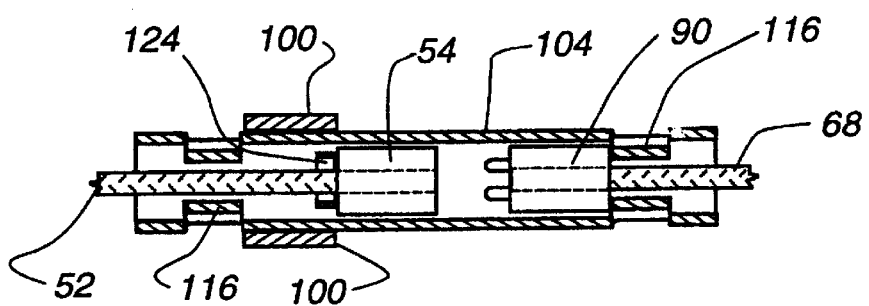
FIG. 14 is a section taken along line 14—14 of FIG. 12.
Figure 15:
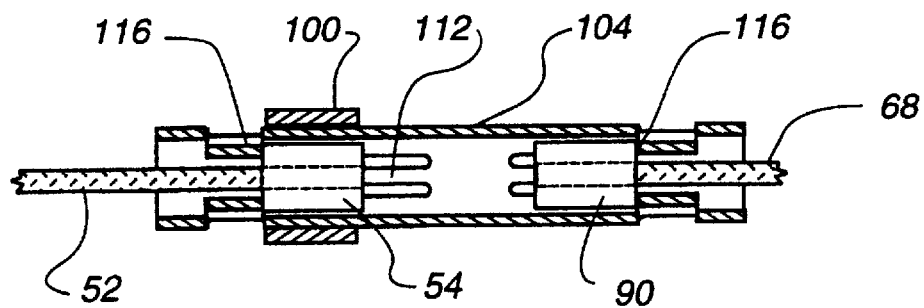
FIG. 15 is a section similar to that of FIG. 14, with the shear tab broken and one cable end repositioned to the terminal position.

As shown in FIGS. 12, 13 and 14, the second end bead 54 of the front cable strand 52 is inserted into the clip connector 104 through the wide central portion 110 in the bottom slot 108 and is held relatively tightly in the cavity 106 of the clip connector 104 by the cantilever spring 112, which pushes the end bead 54 against the opposing side of the clip connector 104. The end bead 54 engages the front surface of the shear tab 124 when the cable system is put under virtually any amount of tension, such as in FIGS. 1 and 2 above. The distance between the rear surface of the shear tab 124 and the front end of the crimping 116 to which the bead abuts once the shear tab 124 is broken defines the relief distance. When the brake lever 48 is actuated, as described above, the end bead 54 is pulled by the front cable strand 52 with sufficient force to overcome the shear strength of the shear tab 124. The shear tab 124 thus breaks and allows the end bead 54 to move through the relief distance to the crimping 116, against which it abuts and is firmly held under tension. See FIG. 15. The initial, or intermediate position of the end bead 54 is defined by the front surface of the shear tab 124, and after Step 3 above, the terminal position of the end bead 54 is defined by the abutting surface 116 of the crimp in the first end 102 of the clip connector 104.

The bead 90 on the first end of the right rear cable strand 68 is inserted into the clip connector 104 through the wide portion 110 in the bottom slot 108 and pulled against the crimping 116 at the second end of the clip connector, and is held in place at that position by the cantilever spring 112 to minimize or prohibit axial movement of the end bead 90 within the cavity 106 of the clip connector 104.

Figure 16:
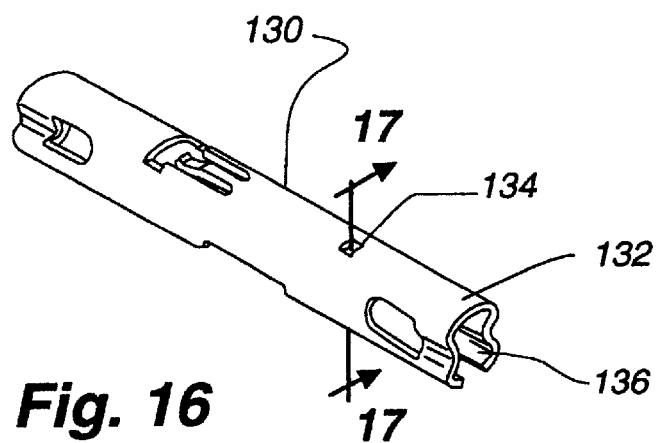
FIG. 16 is top perspective view of an alternative embodiment of the connector clip of FIG. 6.
Figure 17:
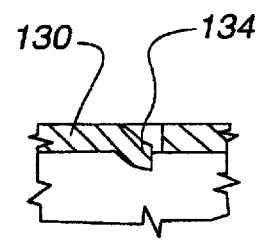
FIG. 17 is a section view taken along line 17—17 of FIG. 16.
Figure 18:
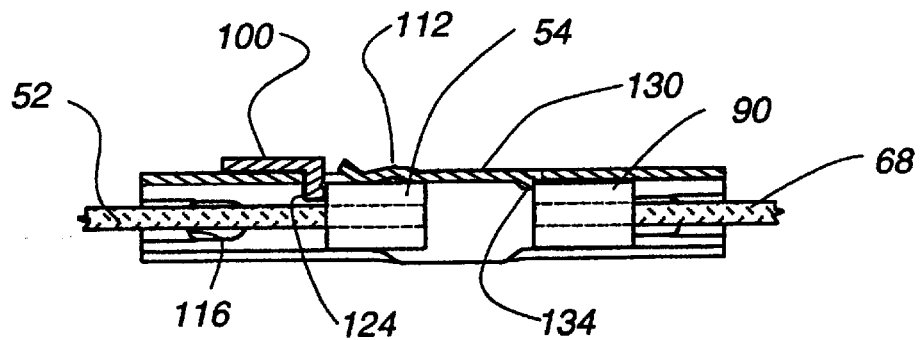
FIG. 18 is a representative section view of the connector clip of FIG. 16.

FIGS. 16 and 17 show a second embodiment of the clip connector 130. The cantilever spring adjacent the second end 132 of the clip connector 130, in this embodiment, is replaced with a much smaller spring detent 134 which forces the end bead 90 against the opposing side wall when in contact with the side of the end bead, and when the end bead 90 is slid past the detent 134 the end of the end bead engages the free end of the detent, thus fixing the end bead against axial movement within the cavity 136 at the second end 132 of the clip connector 130. See FIG. 18. The rest of the connector clip 130 is identical to the clip connector 104 described above.

Figure 19:
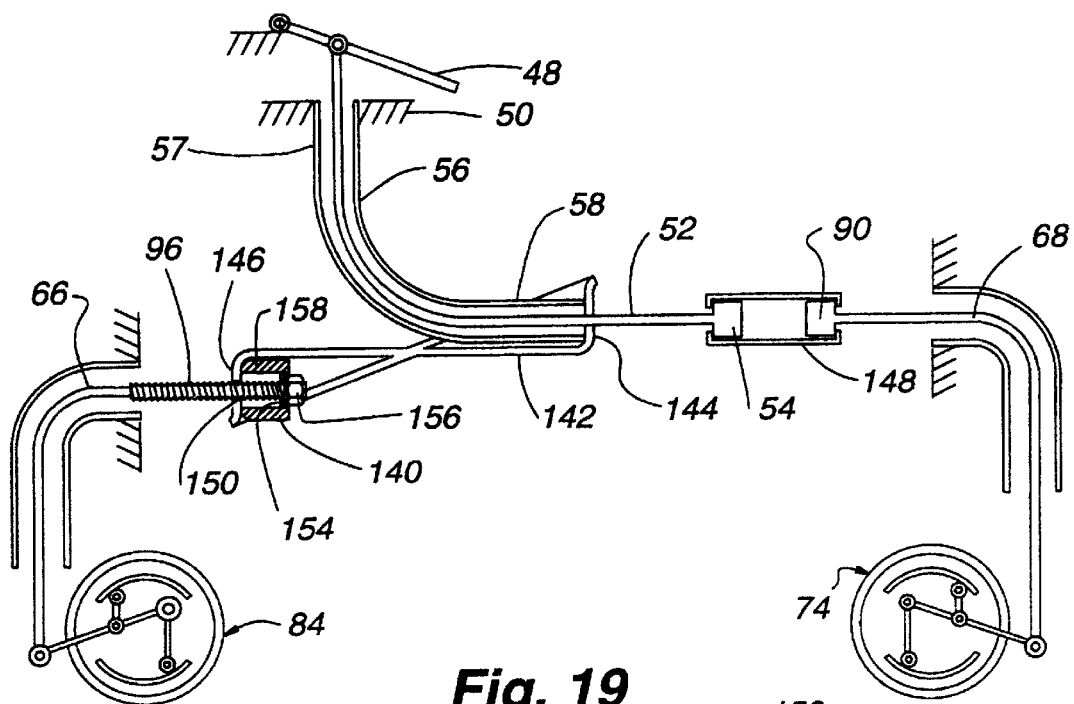
FIG. 19 is a schematic view of a second embodiment of the side pull park brake cable system, including a second embodiment of the connector clip, having a shear member, used therein.
Figure 20:
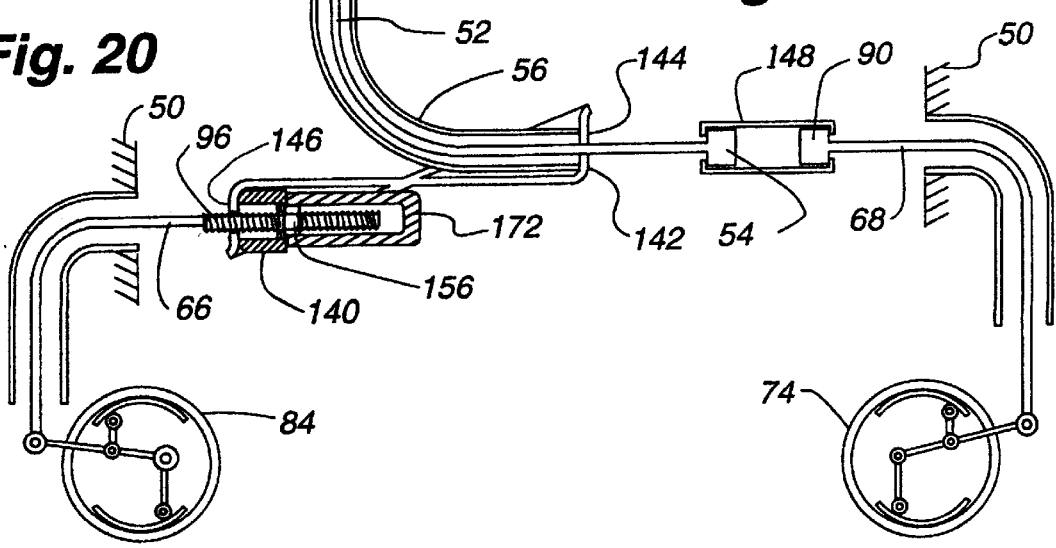
FIG. 20 is a schematic view of the second embodiment of the side pull park brake cable system in a higher tension state.
Figure 22:
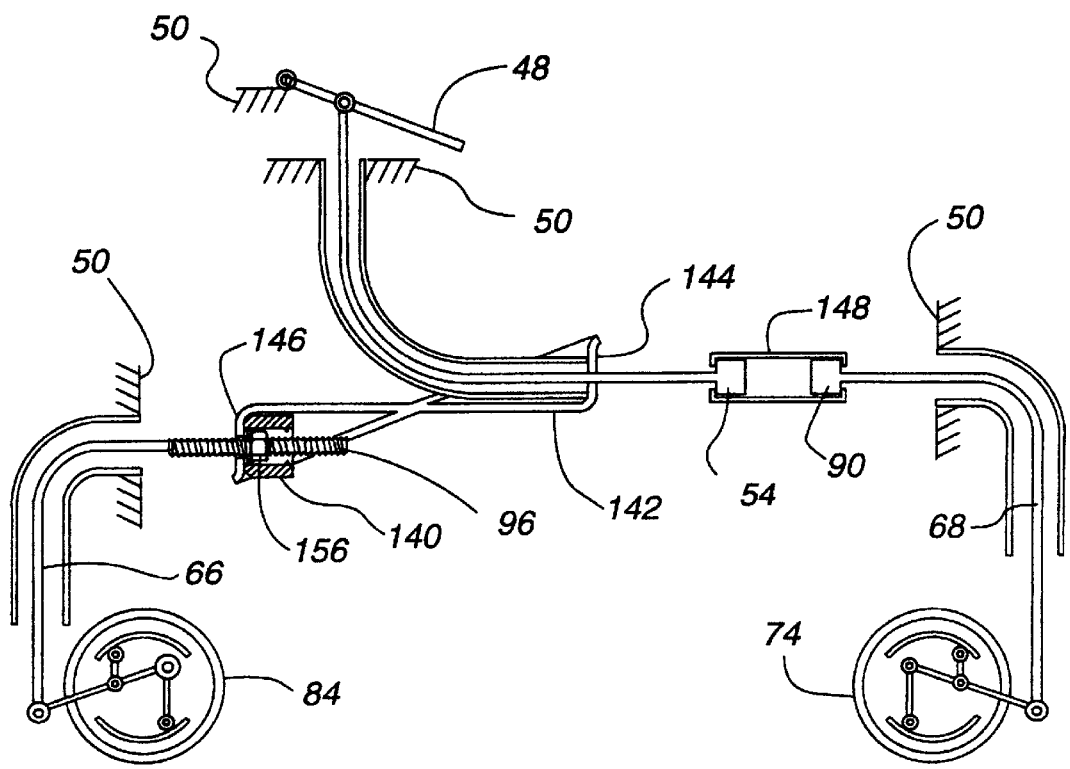
FIG. 22 is a schematic view of the second embodiment of the side pull park brake cable system in a residual tension state after the shear member is broken.
Figure 21:
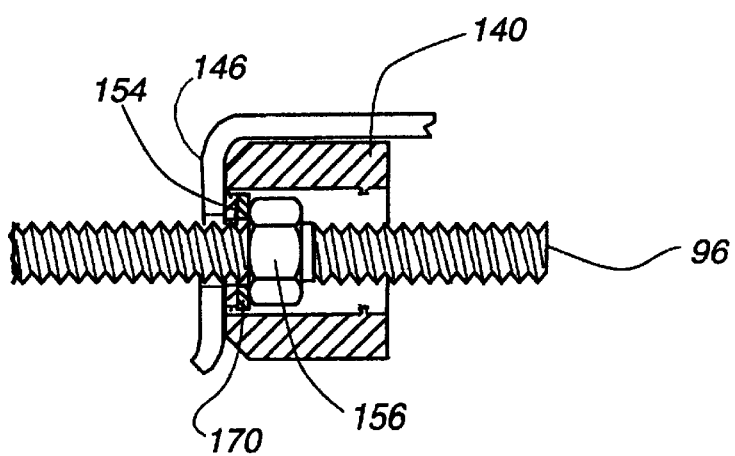
FIG. 21 is an enlarged section of the second embodiment of the connector clip after the shear member is broken.
Figure 23:
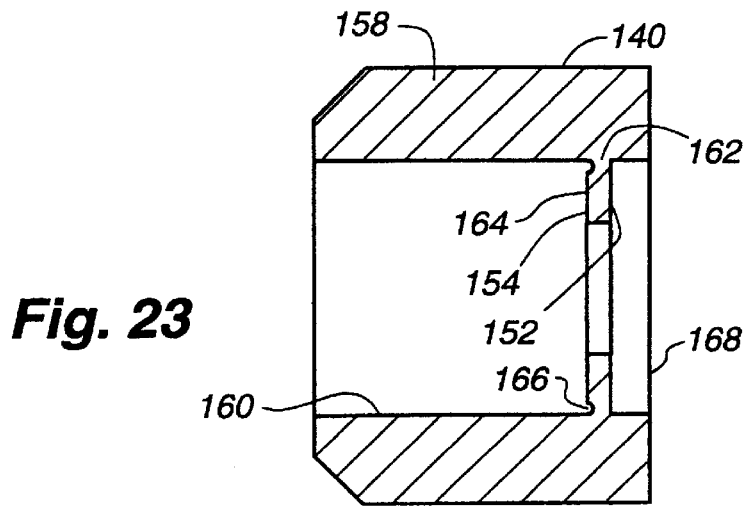
FIG. 23 is an enlarged section of the second embodiment of the connector clip.

FIGS. 19 through 26 show a third embodiment of the connector clip 140 as used in a side-pull park brake system. The steps of adjusting the tension in the cable system of a park brake system using this third embodiment of the clip connector 140 are shown in FIGS. 19, 20, and 22.

In FIG. 19 a Z-shaped equalizer structure 142 is shown used with the third embodiment of the clip connector 140. The Z-shaped equalizer 142 is currently used by Dominion Controls Company of Wixom, Mich., which is part of FKI Automotive Group. The Z-shaped equalizer 142 is one example of an equalizer structure used with this third embodiment of the clip connector 140, but is not the only type of equalizer structure with which this clip connector 140 can be used.

In this third embodiment, the clip connector 140 is used in conjunction with the rear left cable strand 66 and the Z-shaped equalizer structure 142. The Z-shaped equalizer 142 has an elongated body with a first end 144 forming an upwardly extending L-shape, and a second end 146 forming a downwardly extending L-shape. The first end 57 of the front conduit 56 is fixed to the frame 50 of the vehicle, and the second end 58 of the front conduit 56 abuts against the upwardly extending L-shaped leg at the first end 144 of the equalizer 142. A normal cable end connector 148 is used to connect the end bead 54 of the front cable strand 52 with the end bead 90 of the rear right cable strand 68. The rear left cable strand 66 is attached to the downwardly extending portion of the second end 146 Z-shaped equalizer structure 142 by the clip connector 140. The threaded rod 96 is positioned through an aperture 150 formed in the second end 146 of the equalizer structure 142, through the interior cavity of the clip connector 140, and through an aperture 152 (FIG. 19A) in the shear member 154 (shear plate) of the clip connector 140. The threaded rod 96 is held in position by a threaded fastener 156, such as a hex nut threadedly received on the end of the threaded rod 96 and tightened to engage the outside surface of the shear plate 154.

Figure 19A:
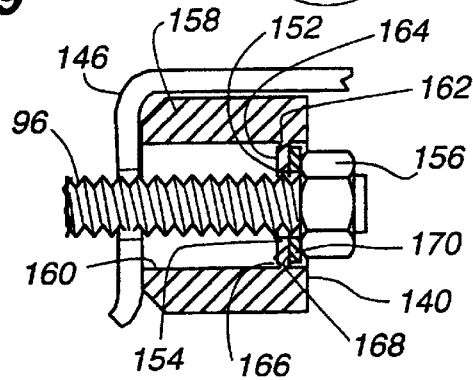
FIG. 19a is an enlarged section of the second embodiment of the connector clip.

In more detail, as shown in FIG. 19a, the connector clip 140 includes a short cylindrical collar 158 defining an axial bore 160 therethrough. At one end of the axial bore, the shear member 154 (shear plate) extends radially inwardly from the walls of the axial bore 160 and defines an interior aperture 152 at the center of the shear disk. The shear disk 154 is formed integrally with the collar 158 and is attached to the inner wall of the axial bore 160 either continuously or at discrete locations by attachment sections 162. The discrete locations of the attachment sections are centered at about 120 degree increments and extend in an arc in a range of approximately 20–60 degrees, and preferably 40 degrees, at a radius of approximately 4 millimeters. The size of the attachment sections can be changed based on the desired maximum shear load that the shear plate must sustain prior to failure. The attachment sections 162 are thinner than the shear plate 154 itself in order to form a stress riser 166 on the rear face 164 of the shear plate 154. The thickness dimension of the stress riser of the attachment section can be approximately 0.7 millimeters. The rest of the shear plate has a thickness of approximately 1.0 to 1.2 millimeters. Again, these dimensions can be modified depending on the desired maximum shear load of the shear plate. The attachment sections 162 are flush with the front side 168 of the shear plate 154 and offset from the rear face 164 of the shear plate as shown in FIGS. 19a to form the stress riser 166. The stress riser 166 could also be on the front face 168 of the shear plate 154. A washer 170 is positioned between the threaded fastener 156 and the shear plate 154. The length and thickness of the attachment sections 162 are determinative of the shear force required to break the shear plate 154 free of the collar 158. A desired shear strength for this embodiment is between approximately 160 and 250 pounds.

As with the first embodiment, the park brake cable system allows the proper tensioning of the cable system to minimize voids and accelerate the creep lengthening of the cable, which helps enhance performance of the park brake cable system in the vehicle, as described above with respect to the first embodiment.

After the park brake cable system has been assembled in the vehicle, the cable system is initially tensioned from having no brake engagement to having brake engagement by actuating the threaded fastener 156 on the end of the threaded rod 96. This can be done with a socket wrench 172, or other type of wrench, as shown in FIG. 20. The threaded fastener 156 is tightened to draw the threaded rod 96 towards the equalizer structure 142, which in turn moves the brake pad towards the brake drum in the left 84 and right 74 brake assemblies. When the left and right brake pads engage the respective brake drums in the left 84 and right 74 brake assemblies, the brake assemblies are engaged. The threaded fastener 156 continues to be tightened to apply more tension load on the park brake cable system.

At the calculated tension load, sufficient shear force has been developed by the threaded fastener 156 on the shear plate 154 to break the shear plate at the attachment sections 162 from the wall of the axial bore of the collar 158. This allows the fastener 156 to exit the tool 172 and pass through the collar 158 to engage the second end 146 of the equalizer structure 142 on top of the washer 170 and the shear plate 154. See FIG. 21. The washer 170 helps evenly distribute the tension load on the shear plate 154. The distance that the disk moves is the relief distance which detensions the cable system sufficiently to disengage the brake pads from the hubs the right amount, with the desired residual tension remaining in the cable system. FIG. 22 shows the cable system after the shear plate has broken. The residual tension for the embodiment of the clip connector in the side pull cable system is also between approximately 90 and 130 pounds.

This method requires only three steps in assembling and setting the park brake cable system. The first is tightening the threaded fastener to tension the cable system sufficiently to eliminate or reduce voids and accelerate the creep of the cable. The second step is increasing the tension by further actuating the threaded fastener 156 until the shear plate 154 severs. The shear force required to brake the shear plate 154 is calculated so as to allow the user to generate sufficiently high tension during tightening of the threaded fastener 156 to adequately minimize voids and accelerate the creep of the cable system. The third step in the first embodiment of actuating the brake lever is thus not required in this embodiment. This embodiment automatically sets the proper tension and cannot be over-adjusted because the fastening member is pulled inside the connector clip 140.

Figure 24:
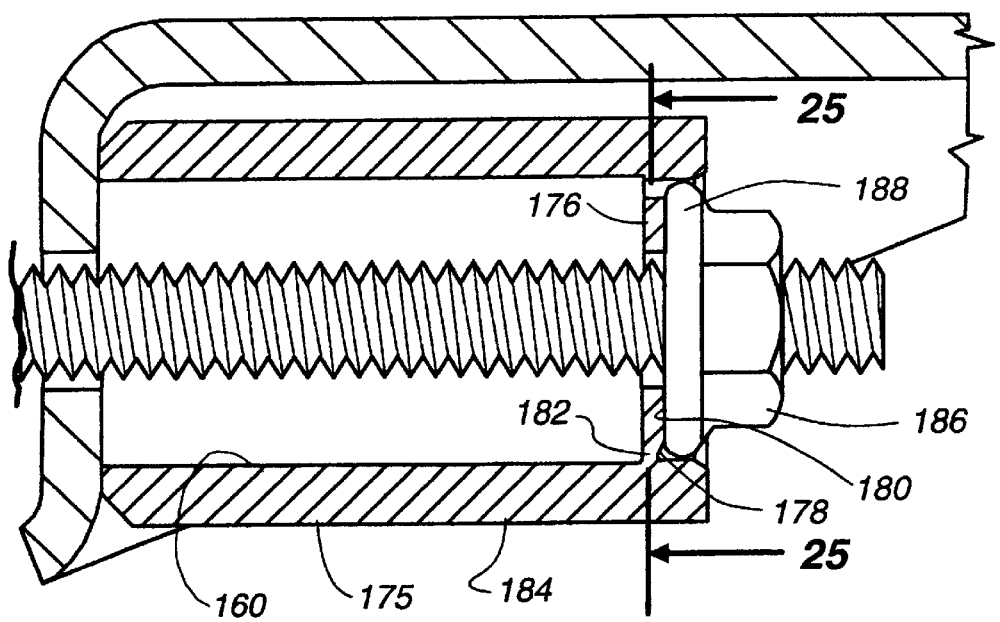
FIG. 24 is an enlarged section of an alternative embodiment of the second embodiment of the connector clip.

An alternative to the third embodiment is shown in FIG. 24. The shear plate 176 in the fourth embodiment 175 shown in FIG. 24 defines the stress riser 178 on the front surface 180 of the sheer plate 176 along the attachment location 182 and adjacent the walls of the collar 184. In addition, the washer is replaced by a threaded fastener 186 having a wider annular base 188 than a standard threaded fastener, such as a flange nut. The wider base 188 allows a more evenly distributed force to be applied to the shear plate 176. The shear force required to break the shear plate 176 depends on the stress riser 178, the size of the shear plate 176, and the structure of the attachment location 182 between the shear plate 176 and the collar 184 (length, thickness, material). The diameter of the axial bore 160 in both the third and fourth embodiment is greater in the end of the collar adjacent the rear face of the shear plate than the diameter of the axial bore 160 in the end adjacent the front face of the shear plate (where the threaded fastener engages the shear plate). The larger diameter allows the threaded fastener to pass through the bore 160 unimpeded after the shear plate is fractured from the collar. The difference in diameters between the larger and smaller diameters is approximately 0.5 millimeter.

Figure 25:
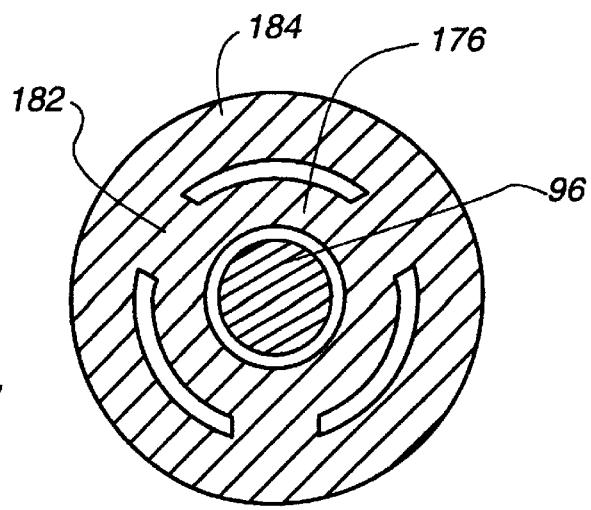
FIG. 25 is a section taken along line 25—25 of FIG. 24.

The third and fourth embodiments of the present invention have the additional advantage over the first and second embodiments in that they do not require a worker to first apply tension to the system by turning the tension adjustment nut and then separately break the shear tab by activating the brake lever. Instead, the third and fourth embodiments simply require a worker to tighten the tension adjusting nut sufficiently to brake the shear plate, which is done all in one operation and saves time and thus manpower. FIG. 25 shows how the shear plate 154 or 176 can be attached only along discrete sections 162 or 182 to the collar 158 or 184, respectively. This can be done for the previous collar embodiment also.

Figure 26:
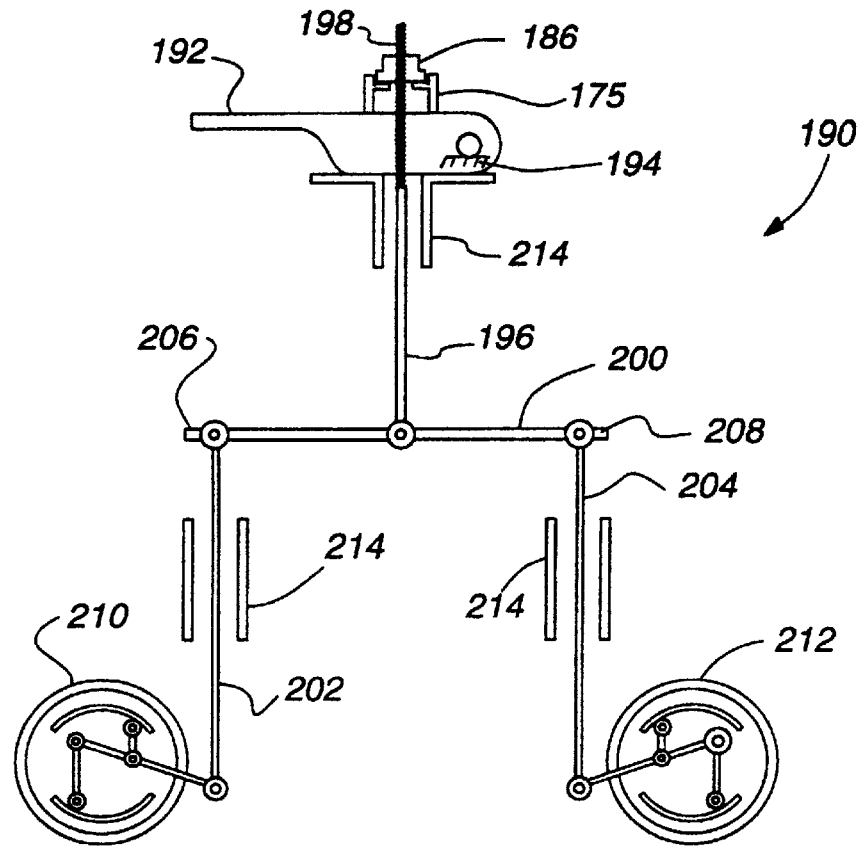
FIG. 26 is a schematic view of the center pull park brake cable system of the present invention, including the second embodiment of the connector clip.
Figure 27:
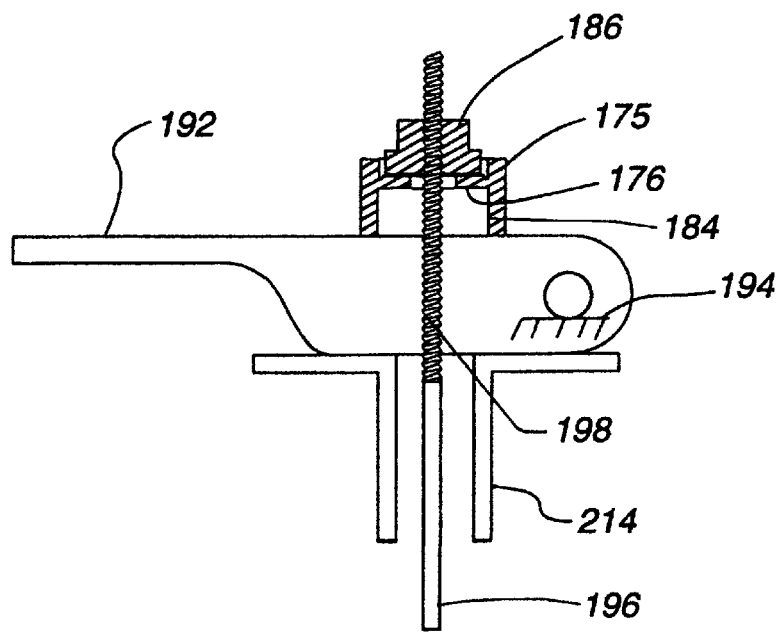
FIG. 27 is an enlarged view of the brake lever and connector clip of FIG. 26.
Figure 28:
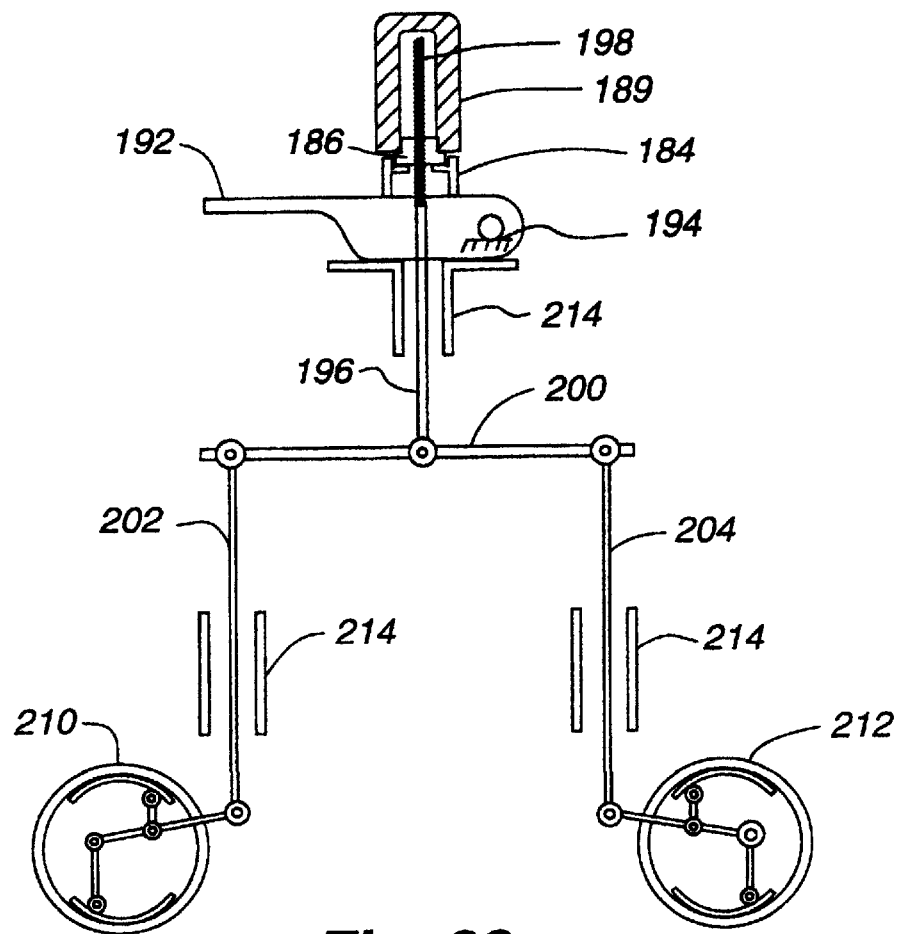
FIG. 28 is a schematic view similar to that of FIG. 26, wherein the cable system is under relatively high tension and the brake pads engage the brake drums.
Figure 29:
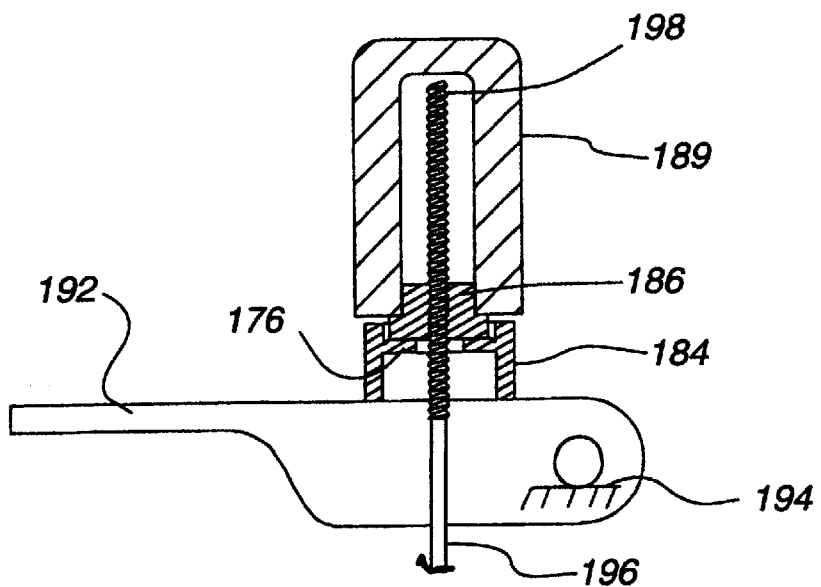
FIG. 29 is an enlarged view of the brake lever and connector clip of FIG. 28.
Figure 30:
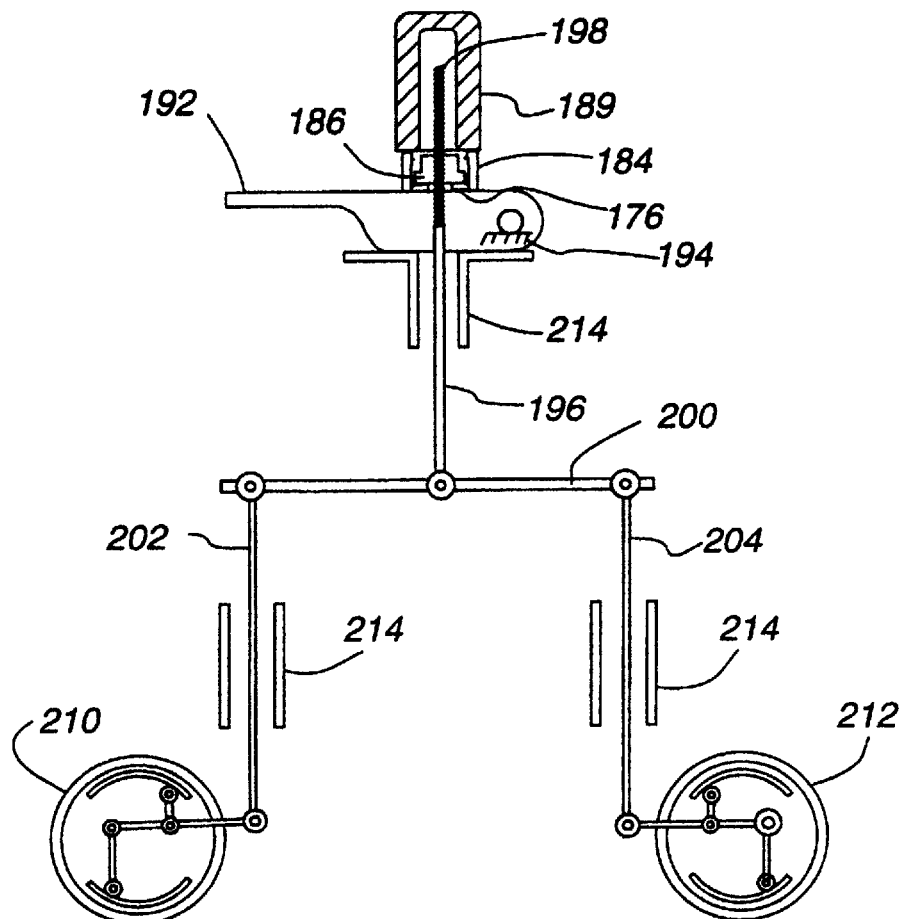
FIG. 30 is a schematic view similar to that of FIG. 28, wherein the shear plate has broken and the cable system is at the state of residual tension.

An application of the fourth embodiment of the present invention is shown in FIGS. 26 through 31. FIGS. 26, 28 and 30 show a center pull park brake cable system 190. Center pull cable systems are generally known. The center pull system includes a brake actuation lever 192 movably connected at one end to the vehicle 194, a front cable strand 196 attached at its first end to a threaded rod 198 and at the second end to an equalizer assembly 200. The threaded rod 198 extends through the brake actuation lever 192 and through the connector clip 175 described above. A threaded tension adjusting nut 186 is received on the threaded rod 198 and engages the shear plate 176 defined in the internal cavity of the collar 184. The second end of the front cable strand 196 is attached to the equalizer structure 200, which effectively transmits equal tension to the left rear cable strand 202 and the right rear cable strand 204.

Schematically, the left rear cable strand 202 is attached to one end 206 of the equalizer structure and the right rear cable strand 204 is attached to the opposite end 208 of the equalizer structure, with the front cable strand 196 attached to the equalizer 200 assembly mid-way between the two. The second ends of the left rear 202 and right rear 204 cable strands are attached to the left rear 210 and right rear 212 brake assemblies, respectively, as shown. The right rear 212 and left rear 210 brake assemblies work as described above. The equalizer 200 can be a rigid bar. The front cable strand 196 and the left 202 and right rear 204 cable strands pass through conduits 214 as in the previous embodiments. The center pull system 190 does not rely on reaction conduit force balancing, however.

The method of properly tensioning the park brake cable system 190 of this embodiment includes the steps of assembling the park brake cable system as described above such that the brake actuation lever 192 is in its release position (FIG. 26) and the cable system is not yet effectively tensioned. The next step is to actuate the tension adjusting member 186 to draw the threaded rod 198 upwardly with respect to FIG. 26 and thus apply tension to the front cable strand 196. The tension adjusting nut 186 can be actuated by any typical wrench 189 or suitable hand or power tool. As the front cable strand 196 is put under tension, the left 202 and right rear 204 cable strands are also put under tension through the equalizer structure 200. The left and right rear cable strands act to move the brake pads towards the brake drums as the tension overcomes the springs in the brake assemblies 210 and 212. The tension adjusting member 186 is continued to be actuated to increase the tension even after the brake shoes engage the brake drums. The increased tension in the cable system removes voids from the system, including from the cable as well as from where the cable runs through the conduits. The shear plate 176 within the collar 184 holds the tensioning nut 186 in the initial position at this heightened tension level. For a center-pull cable system, an acceptable tension level at this point is between 300–600 pounds.

Figure 31:
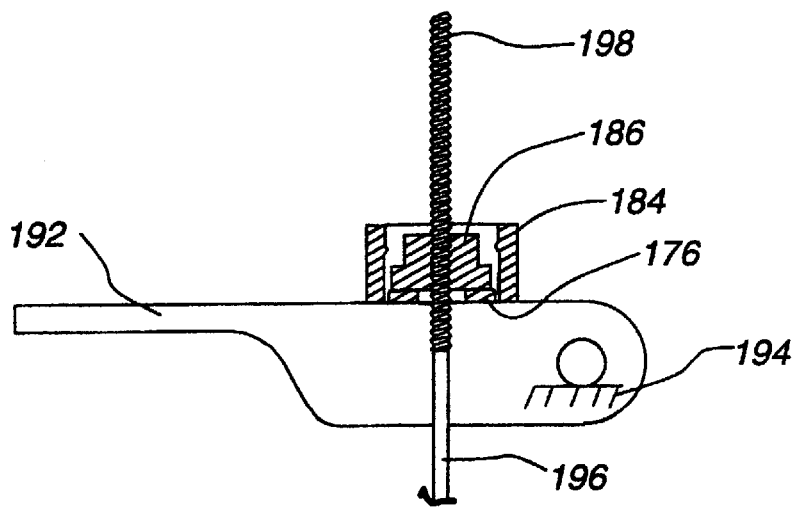
FIG. 31 is an enlarged view of the brake lever and connector clip of FIG. 30.

Step 3 requires the tension adjusting member 186 to continue to be actuated until the tension force in the cables overcome the force required to cause a shear plate 176 to fracture and separate from the collar 184. This tension load is approximately 300 to 600 pounds, which is sufficient to overcome the shear strength of the shear plate 176. The cable tension, once the shear plate 176 disconnects, pulls the tensioning member 186 into the collar 184 and out of engagement with the tool used to tighten the adjusting member 186. The tension member 186 moves a specific distance to the end of the collar 184 and rests against the brake actuation lever 192. See FIGS. 30 and 31. The tension is relieved just enough to release the brake shoes from engaging the brake drums, and a residual tension of approximately 150 to 250 pounds remains in the cable system 190. As shown in FIG. 31, the distance traveled, or relief distance, is the distance between the bottom surface of the shear plate 176 and the brake actuation lever 192 where the bottom surface of the shear plate 176 rests. The relief distance can preferably range from 25–50 millimeters. At this point the tension in the brake cable system 190 is set at the adequate level. As shown in this example of the use of the fourth embodiment, the third and fourth embodiments of the cable connector clip can be used on an equalizer, or elsewhere in the cable system, such as on the brake lever.

The connector clip of the present invention works in the described cable systems to effectively apply sufficient tension to remove voids and activate cable stretching. In addition, the shear member acts as a "fuse" to allow the proper offset of tension when a critical high tension level has been reached. The residual tension in the system is sufficient to provide consistent park brake performance.

Presently preferred embodiments of the present invention and many of its improvements have been described with a degree of particularity. The previous description is of a preferred example for implementing the invention, and the scope of the invention should not necessarily be limited by this description. The scope of the present invention is defined by the scope of the following claims.

I claim:

1. A method of adjusting the tension in a park cable brake system comprising the acts of:

providing a brake actuation lever, a connector clip having a first end and a second end, and including a shear member having a shear failure force, positioned between the first and second ends of said connector clip, a brake assembly, a front cable strand having a first and second ends, the first end attached to the brake actuation lever, and the second end engaging the shear member on the connector clip, a rear cable strand having a first end and a second end, the first end attached to the second end of the connector clip and the second end attached to the rear brake assembly, and tensioner means attached in a tension force transmitting relationship with the front cable strand and the rear cable strand;

tensioning said front and said rear cable strands with said tensioner means; and breaking said shear member.

2. A method of adjusting the tension in a park cable brake system comprising the acts of:

providing a brake actuation lever, a connector clip having a first end and a second end, and including a shear member having a shear failure force, positioned between the first and second ends of said connector clip, a brake assembly, front cable strand having a first and second ends, the first end attached to the brake actuation lever, and the second end engaging the shear member on the connector clip, a rear cable strand having a first end and a second end, the first end attached to the second end of the connector clip and the second end attached to the rear brake assembly, and tensioner means attached in a tension force transmitting relationship with the front cable strand and the rear cable strand;

tensioning said front and said rear cable strands with said tensioner means; and actuating said brake lever to break said shear member.

3. A method as defined in claim 2, wherein:

said brake lever is a side-pull brake lever; and actuating said side-pull brake lever to break said shear member.

4. A method of adjusting the tension in a park cable brake system comprising the acts of:

providing a first cable strand having opposing ends;

providing a second cable strand having opposing ends;

providing a cable connector clip having a shear member to couple said first cable strand to said second cable strand, wherein one end of said first cable strand engages said shear member;

providing tensioner means;

tensioning said first and second cable strands with said tensioner means; and breaking said shear member engaged by said one end of said first cable strand.

5. A method as defined in claim 4, further comprising the acts of:

providing a third cable having opposing ends, with one end attached to said tensioner means; and wherein tensioning said first and second cable with said tensioning means also tensions said third cable.

6. A method of adjusting the tension in a park cable brake system comprising the acts of:

providing a connector clip including a shear member having a shear failure force, a front cable strand operably engaging the connector clip, a rear cable strand operably engaging the connector clip, and tensioner means operably attached in a tension force transmitting relationship with the front cable strand and the rear cable strand;

tensioning said front and said rear cable strands with said tensioner means to break said shear member.

7. A method as defined in claim 6, wherein:

said front cable strand engages said shear member; and tensioning said first and second cable strands causes said front cable strand to break said shear member.

8. A method as defined in claim 6, wherein:

said rear cable strand engages said shear member; and tensioning said first and second cable strands causes said rear cable strand to break said shear member.

9. A method of adjusting the tension in a park cable brake system comprising the acts of:

providing a brake actuation lever, a connector clip having a first end and a second end, and including a shear member having a shear failure force, a brake assembly, a front cable strand having a first and second ends, the first end operably attached to the brake actuation lever, and the second end operably engaging the connector clip, a rear cable strand having a first end and a second end, the first end operably attached to the connector clip and the second end operably attached to the rear brake assembly, and tensioner means operably attached in a tension force transmitting relationship with the front cable strand and the rear cable strand;

tensioning said first and second cable strands with said tensioner means; and breaking said shear member.

10. A method of adjusting the tension in a park cable brake system comprising the acts of:

providing a brake actuation lever, a connector clip having a first end and a second end, and including a shear member having a shear failure force, a brake assembly, a front cable strand having a first and second ends, the first end operably attached to the brake actuation lever, and the second end operably engaging the connector clip, a rear cable strand having a first end and a second end, the first end operably attached to the connector clip and the second end operably attached to the rear brake assembly, and tensioner means operably attached in a tension force transmitting relationship with the front cable strand and the rear cable strand;

tensioning said first and second cable strands with said tensioner means; and actuating said brake lever to break said shear member.

11. A method as defined in claim 10, wherein:

said brake lever is a side-pull brake lever; and actuating said side-pull brake lever to break said shear member.

12. A method of adjusting the tension in a park cable brake system comprising the acts of:

providing a first cable strand having opposing ends;

providing a second cable strand having opposing ends;

providing a cable connector clip having a shear member to couple said first cable strand to said second cable strand, wherein one end of said first cable strand engages said shear member;

tensioning a first and second cable strands with a tensioner means to a first tension level; and breaking said shear member engaged by said end of said first cable strand to reduce the tension in said first and second cable strands to a second tension level lower than said first tension level.

13. A method of adjusting the tension in a park cable brake system comprising the acts of:

providing a first cable strand having opposing ends;

providing a second cable strand having opposing ends;

providing a cable connector clip having a shear member to couple said first cable strand to said second cable strand, wherein one end of said second cable strand engages said shear member;

providing tensioner means;

tensioning said first and second cable strands with said tensioner means; and breaking said shear member engaged by said one end of said second cable strand.

14. A method of adjusting the tension in a park cable brake system comprising the acts of:

providing a first cable strand having opposing ends;

providing a second cable strand having opposing ends;

providing a cable connector clip having a shear member to couple said first cable strand to said second cable strand, wherein one end of said second cable strand engages said shear member;

tensioning a first and second cable strands with a tensioner means to a first tension level; and breaking said shear member engaged by said end of said second cable strand to reduce the tension in said first and second cable strands to a second tension level lower than said first tension level.

15. A method of adjusting the tension in a park cable brake system comprising the acts of:

providing a brake actuation lever, a connector clip having a first end and a second end, and including a shear member having a shear failure force, positioned between the first and second ends of said connector clip, a brake assembly, a front cable strand having a first and second ends, the first end attached to the brake actuation lever, and the second end engaging the connector clip, a rear cable strand having a first end and a second end, the first end engaging the shear member of the connector clip and the second end attached to the rear brake assembly, and tensioner means attached in a tension force transmitting relationship with the front cable strand and the rear cable strand;

tensioning said front and said rear cable strands with said tensioner means; and breaking said shear member.

16. A method of adjusting the tension in a park cable brake system comprising the acts of:

providing a brake actuation lever, a connector clip having a first end and a second end, and including a shear member having a shear failure force, positioned between the first and second ends of said connector clip, a brake assembly, a front cable strand having a first and second ends, the first end attached to the brake actuation lever, a rear cable strand having a first end and a second end, the first end attached to the rear brake assembly, and tensioner means, the second end of the front cable, the first end of the rear cable, and the tensioner means operably connected in a tension force transmitting relationship to said shear tab;

tensioning said front and said rear cable strands with said tensioner means; and breaking said shear member.

* * * * *